Figure 1:
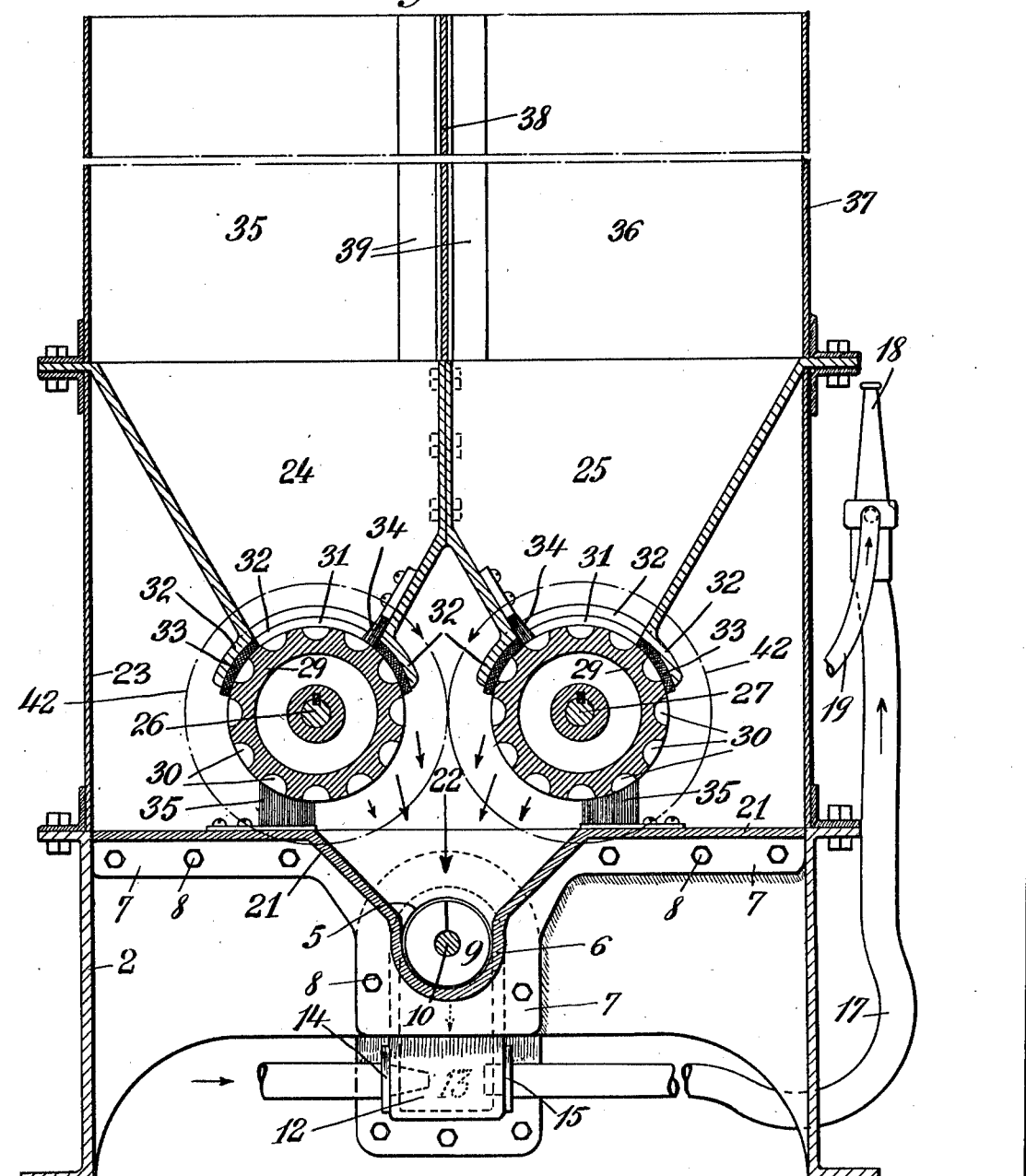

A. V. JENSEN.
PROCESS OF MIXING PLASTIC MIXTURES.
APPLICATION FILED FEB. 8, 1912.

1,096,785.

Patented May 12, 1914.
2 SHEETS—SHEET 1.

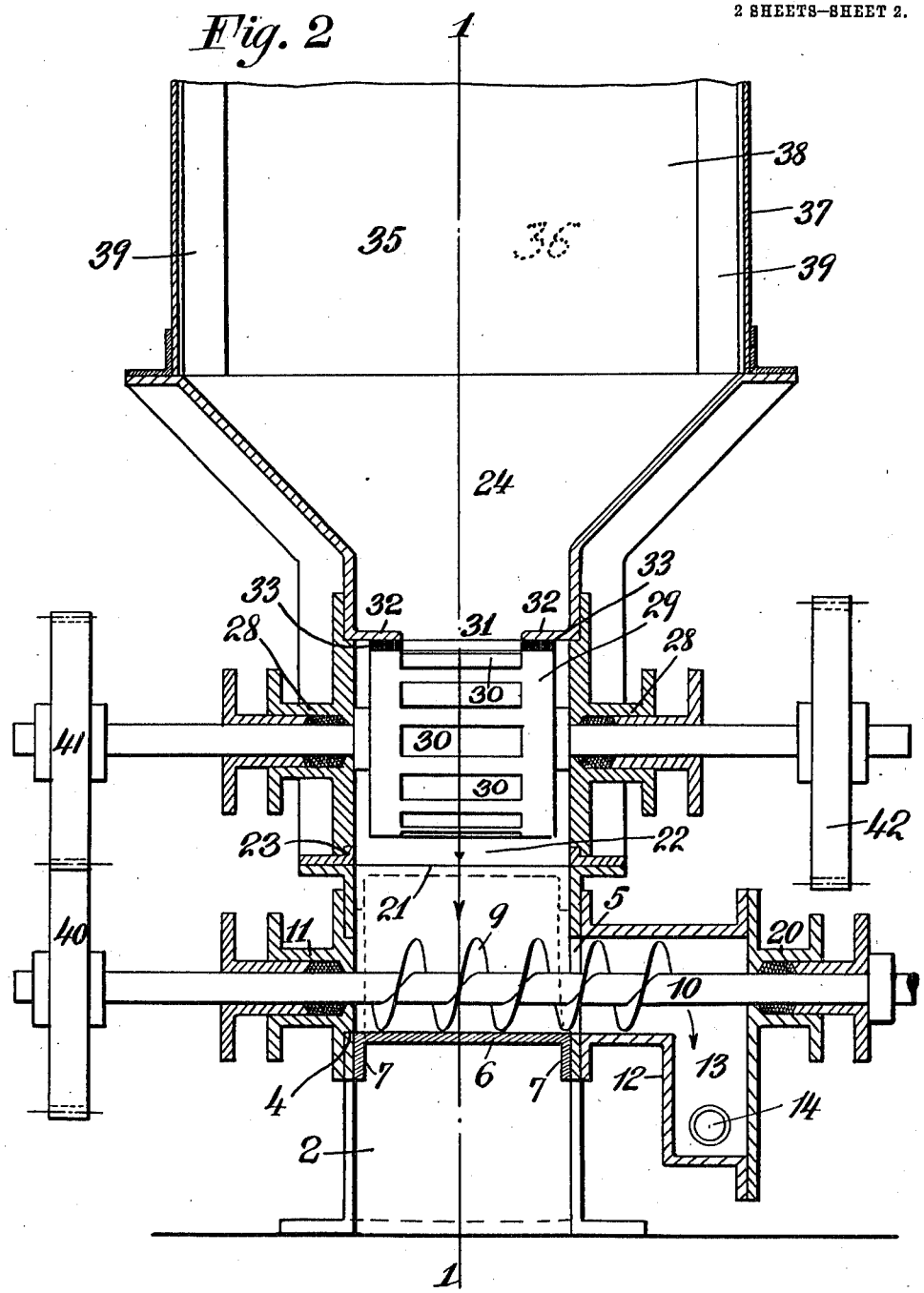

UNITED STATES PATENT OFFICE.

ALEXANDER V. JENSEN, OF BROOKLYN, NEW YORK.

PROCESS OF MIXING PLASTIC MIXTURES.

1,096,785.      Specification of Letters Patent.      Patented May 12, 1914.

Application filed February 8, 1912. Serial No. 676,183.

*To all whom it may concern:*

Be it known that I, ALEXANDER V. JENSEN, a citizen of the Danish Monarchy, and a resident of Brooklyn, Kings county, New York, have invented certain new and useful Improvements in Processes of Mixing Plastic Mixtures, of which the following is a specification.

This invention relates to an improved process for mixing plastic mixtures by the use of a cement gun.

In contradistinction to the art the object of this invention is to provide a process for mixing plastic mixtures which consist in feeding the ingredients, by means of a suitable feeder from a source of supply, such as an open hopper for instance, preventing the return of the ingredients to the supply; feeding the ingredients in a freely falling stream; subject them to a pneumatic blast acting transversely to the falling ingredients and adding liquid to the mixed material while it is being conveyed by the pneumatic blast.

In the following specification I have described an apparatus for carrying out my process and which is illustrated in the accompanying drawings in which, Figure 1 is a vertical sectional view of a cement gun embodying my invention and taken on the line 1—1 of Fig. 2, and Fig. 2 is a similar view in a plane at right angle to the plane of Fig. 1.

In the drawings 2 represents a base of suitable strength and design to form a support for the entire apparatus and which is provided on opposite sides with apertures 4 and 5. To the base is secured a mixer trough 6 by means of flanges 7 and bolts 8. Within the mixer trough 6 there is located the mixer and conveyer 9 which in this instance is in the form of an endless screw on a shaft 10. The screw extends to the one side through the aforesaid aperture 5 in the base and the shaft 10 extends to the other side through the aperture 4, beyond which the shaft passes through a stuffing box 11. The aperture 5 is closed by a casing 12 forming a chamber 13. In the walls of the casing 12 the air nozzle 14 and the inlet end 15 of the hose or conduit 17 are secured. The nozzle 12 is connected with a suitable air compressor not shown, and delivers a blast of air which crosses the chamber 13 and enters the alined inlet 15 of the conduit 17. Water is supplied to the latter near its discharge end by way of a hose 19. The shaft 10 extends through the casing 12 outside of which it passes through a stuffing box 20.

The mixer trough 6 forms the bottom 21 of the feed chamber 22 formed within a casing 23 suitably secured to the base. Within said chamber there is supported two feed chutes 24 and 25. In the walls of the casing 23 two shafts 26 and 27 are journaled by means of stuffing boxes 28. Secured to each shaft is a feed drum 29 having pockets 30. The mouths 31 of the chutes 24 and 25 are provided with flanges 32 which extend in over the sides of the drums as shown. Between the flanges 32 and the drum there are interposed gaskets 33, one for each drum. Upper and lower cleaning brushes 34 and 35 are secured in the chutes and on the bottom 21. The construction is such that the drums by revolving against the gaskets, which latter are of a suitable yielding material such for instance as wool or rubber, prevents the back pressure from the discharge chamber from passing into the chutes and thence into the hoppers 35 and 36. These latter are formed within a single hopper 37 by means of a partition 38 suitably held in flanges 39. Power is supplied to the shaft 10 in any suitable manner and from this shaft the one drum shaft 26 is driven by means of gears 40 and 41. The drum shafts are driven in opposite direction by the gears 42.

In operation the hoppers are filled with material, as for instance sand in hopper 35 and cement in hopper 36. Or the material already mixed may be put in one of these hoppers or in the hopper 37 from which then the partition 38 may be removed. When the machine is started it will be seen that as the feed drums rotate, they carry the materials around in the pockets 30 from which it falls into the mixer trough 6 where the materials are thoroughly mixed by the mixer screw 9 and at the same time conveyed to the chamber 13 where it falls down and in which the stream of falling mixed material is intercepted by the air blast from the air nozzle 14 and blown into the hose 17 through the discharge nozzle 15. During the rotation of the feed drums the back air pressure is prevented from passing into the hoppers as already explained. The upper cleaning brushes 34 effectively prevent clogged portions of the material, or stones or small lumps from passing in between the gaskets and the drum. The brushes 35 clean the surfaces of the drums.

In the nozzle chamber a free fall is provided so that the material forms a loose stream which may easily be acted upon by the air blast. And it is a feature of the invention that the air blast blows in a direction at right angles to the direction of the feed or conveying of the screw 9. I have found that this gives better results than when the air blast is in a direction parallel to the axis of the screw, because in the latter case the blast does not take away all of the material but only a portion thereof due to the fact that the falling material forms a sort of sheet as it leaves the surface of the screw 9.

I claim:

1. The process of mixing plastic mixtures, comprising feeding the dry ingredients of plastic material, preventing the return of said ingredients, mixing said fed ingredients and feeding the same in a freely falling stream subjecting said falling stream to a pneumatic blast transverse thereto, and adding a liquid to said mixed material while being conveyed by said blast.

2. The process of mixing the ingredients of cement or similar material comprising dropping the dry material in the form of a freely falling stream into a transverse traveling air blast and adding a liquid to the blast-carried particles while being conveyed by said air blast.

Signed at New York, N. Y. this 6th day of February 1912.

ALEXANDER V. JENSEN.

Witnesses:
 IVAN KONIGSBERG,
 K. G. LE ARD.